(12) United States Patent
Watkins

(10) Patent No.: US 6,267,431 B1
(45) Date of Patent: Jul. 31, 2001

(54) VEHICLE SECURITY SHADE ASSEMBLY

(76) Inventor: Jason Watkins, 1200 Fullerwiser Rd., Apt 123, Euless, TX (US) 76039

( * ) Notice: Subject to any disclaimer, the term of this patent is extended or adjusted under 35 U.S.C. 154(b) by 0 days.

(21) Appl. No.: 09/667,023

(22) Filed: Sep. 21, 2000

(51) Int. Cl.$^7$ ................................................. B60J 3/00
(52) U.S. Cl. ............................................ 296/97.4; 296/97.1
(58) Field of Search .................................... 296/97.1, 97.2, 296/97.4, 97.7, 97.8; 160/370.21, 201, DIG. 6

(56) References Cited

U.S. PATENT DOCUMENTS

| D. 310,195 | 8/1990 | Ruimi . |
| 1,291,389 | 7/1919 | Brixey . |
| 1,913,961 | * 6/1933 | Shape ................................. 296/97.7 |
| 4,442,881 | 4/1984 | Monteath et al. . |
| 4,921,299 | 5/1990 | Herrick . |
| 5,042,866 | * 8/1991 | Cody ................................... 296/97.4 |
| 5,344,206 | * 9/1994 | Middleton ........................... 296/97.8 |
| 5,404,926 | 4/1995 | Ojima et al. . |
| 5,443,300 | * 8/1995 | Mohammed ........................ 296/97.4 |
| 5,615,924 | 4/1997 | Owen . |
| 5,645,119 | * 7/1997 | Caruso ............................. 296/97.4 X |
| 5,746,469 | 5/1998 | Nonaka . |
| 5,884,731 | * 3/1999 | Young ................................ 296/97.4 |
| 5,947,544 | * 9/1999 | Hubeshi ............................. 296/97.4 |
| 6,095,231 | * 8/2000 | Hahn ............................... 296/97.8 X |

* cited by examiner

Primary Examiner—D. Glenn Dayoan
Assistant Examiner—Lori L. Coletta

(57) ABSTRACT

A vehicle security shade assembly for providing a security system for vehicles for safeguarding against theft of the vehicles. The vehicle security shade assembly includes elongate support members each being adapted to be securely mounted to an inner side of a windshield along a respective side end thereof; and also includes upper and lower track members being securely attached to the elongate support members and extending therebetween; and further includes upper and lower shade support members each being movably mounted to and movable along a respective track member; and also includes shade members each being retractably carried about a respective elongate support member and also being securely attached to a respective upper shade support member and a respective lower shade support member for movement therewith; and further includes a shade member moving assembly for moving the shade members along the track members.

17 Claims, 2 Drawing Sheets

VEHICLE SECURITY SHADE ASSEMBLY

BACKGROUND OF THE INVENTION

1. Field of the Invention

The present invention relates to a security shade assembly for vehicles and more particularly pertains to a new vehicle security shade assembly for providing a security system for vehicles for safeguarding against theft of the vehicles.

2. Description of the Prior Art

The use of a security shade assembly for vehicles is known in the prior art. More specifically, a security shade assembly for vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,4004,926; U.S. Pat. No. 5,746,469; U.S. Pat. No. 4,921,299; U.S. Pat. No. Des. 310,195; U.S. Pat. No. 1,291,389; and U.S. Pat. No. 4,442,881.

While these devices fulfill their respective, particular objectives and requirements, the aforementioned patents do not disclose a new vehicle security shade assembly. The inventive device includes elongate support members each being adapted to be securely mounted to an inner side of a windshield along a respective side end thereof; and also includes upper and lower track members being securely attached to the elongate support members and extending therebetween; and further includes upper and lower shade support members each being movably mounted to and movable along a respective track member; and also includes shade members each being retractably carried about a respective elongate support member and also being securely attached to a respective upper shade support member and a respective lower shade support member for movement therewith; and further includes a shade member moving assembly for moving the shade members along the track members.

In these respects, the vehicle security shade assembly according to the present invention substantially departs from the conventional concepts and designs of the prior art, and in so doing provides an apparatus primarily developed for the purpose of providing a security system for vehicles for safeguarding against theft of the vehicles.

SUMMARY OF THE INVENTION

In view of the foregoing disadvantages inherent in the known types of security shade assembly for vehicles now present in the prior art, the present invention provides a new vehicle security shade assembly construction wherein the same can be utilized for providing a security system for vehicles for safeguarding against theft of the vehicles.

The general purpose of the present invention, which will be described subsequently in greater detail, is to provide a new vehicle security shade assembly which has many of the advantages of the security shade assembly for vehicles mentioned heretofore and many novel features that result in a new vehicle security shade assembly which is not anticipated, rendered obvious, suggested, or even implied by any of the prior art security shade assembly for vehicles, either alone or in any combination thereof.

To attain this, the present invention generally comprises elongate support members each being adapted to be securely mounted to an inner side of a windshield along a respective side end thereof; and also includes upper and lower track members being securely attached to the elongate support members and extending therebetween; and further includes upper and lower shade support members each being movably mounted to and movable along a respective track member; and also includes shade members each being retractably carried about a respective elongate support member and also being securely attached to a respective upper shade support member and a respective lower shade support member for movement therewith; and further includes a shade member moving assembly for moving the shade members along the track members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle security shade assembly which has many of the advantages of the security shade assembly for vehicles mentioned heretofore and many novel features that result in a new vehicle security shade assembly which is not anticipated, rendered obvious, suggested, or even implied by any of the prior art security shade assembly for vehicles, either alone or in any combination thereof.

It is another object of the present invention to provide a new vehicle security shade assembly which may be easily and efficiently manufactured and marketed.

It is a further object of the present invention to provide a new vehicle security shade assembly which is of a durable and reliable construction.

An even further object of the present invention is to provide a new vehicle security shade assembly which is susceptible of a low cost of manufacture with regard to both materials and labor, and which accordingly is then susceptible of low prices of sale to the consuming public, thereby making such vehicle security shade assembly economically available to the buying public.

Still yet another object of the present invention is to provide a new vehicle security shade assembly which provides in the apparatuses and methods of the prior art some of the advantages thereof, while simultaneously overcoming some of the disadvantages normally associated therewith.

Still another object of the present invention is to provide a new vehicle security shade assembly for providing a security system for vehicles for safeguarding against theft of the vehicles.

Yet another object of the present invention is to provide a new vehicle security shade assembly which includes elongate support members each being adapted to be securely mounted to an inner side of a windshield along a respective side end thereof; and also includes upper and lower track members being securely attached to the elongate support members and extending therebetween; and further includes upper and lower shade support members each being movably mounted to and movable along a respective track member; and also includes shade members each being retractably carried about a respective elongate support member and also being securely attached to a respective upper shade support member and a respective lower shade support member for movement therewith; and further includes a shade member moving assembly for moving the shade members along the track members.

Still yet another object of the present invention is to provide a new vehicle security shade assembly that generally prevents a vehicle from being stolen by essentially blocking the view of the person trying to steal the vehicle.

Even still another object of the present invention is to provide a new vehicle security shade assembly that also provides shade to the interior of the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
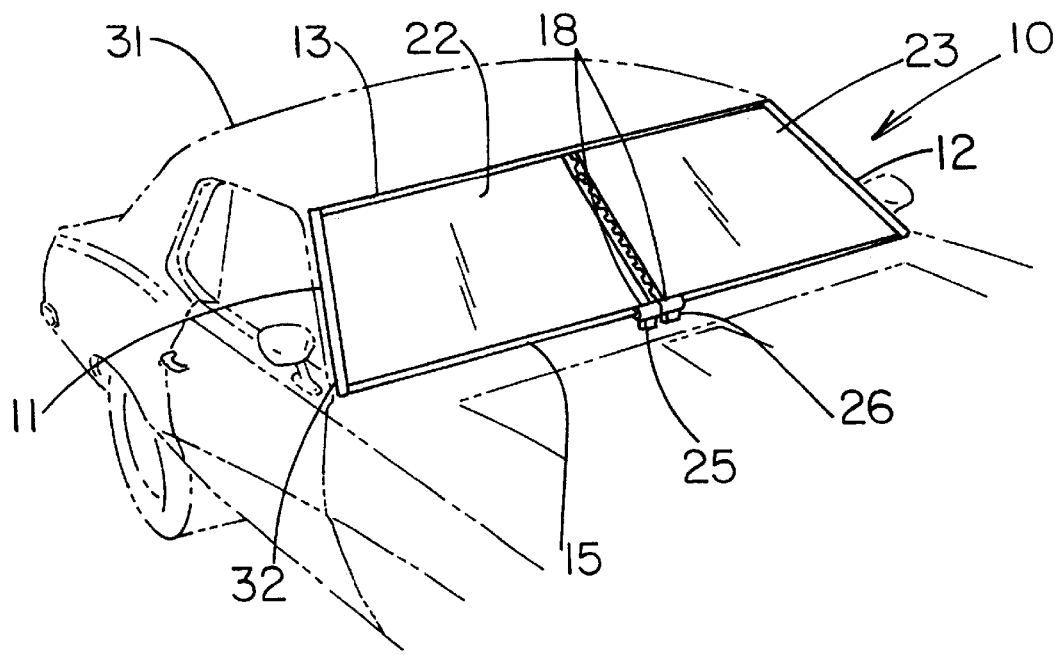
FIG. 1 is a perspective view of a new vehicle security shade assembly according to the present invention shown in use.
Figure 2:
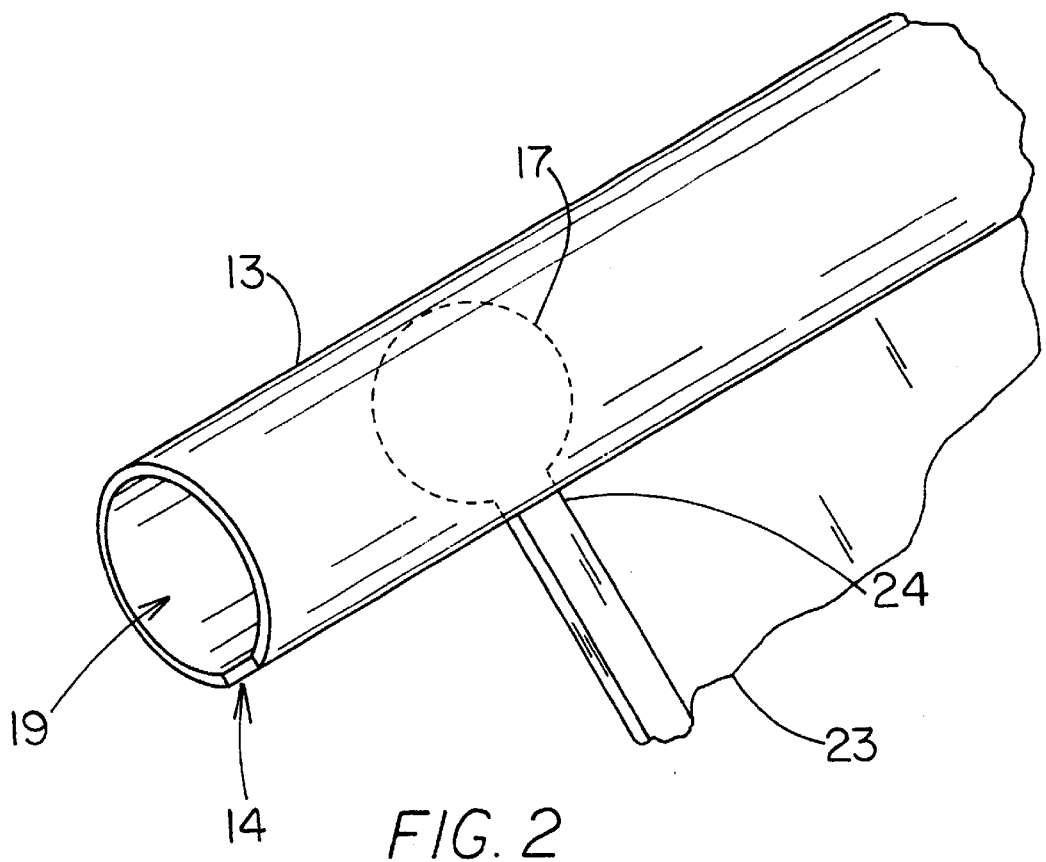
FIG. 2 is a detailed perspective view of the upper track member of the present invention.
Figure 3:
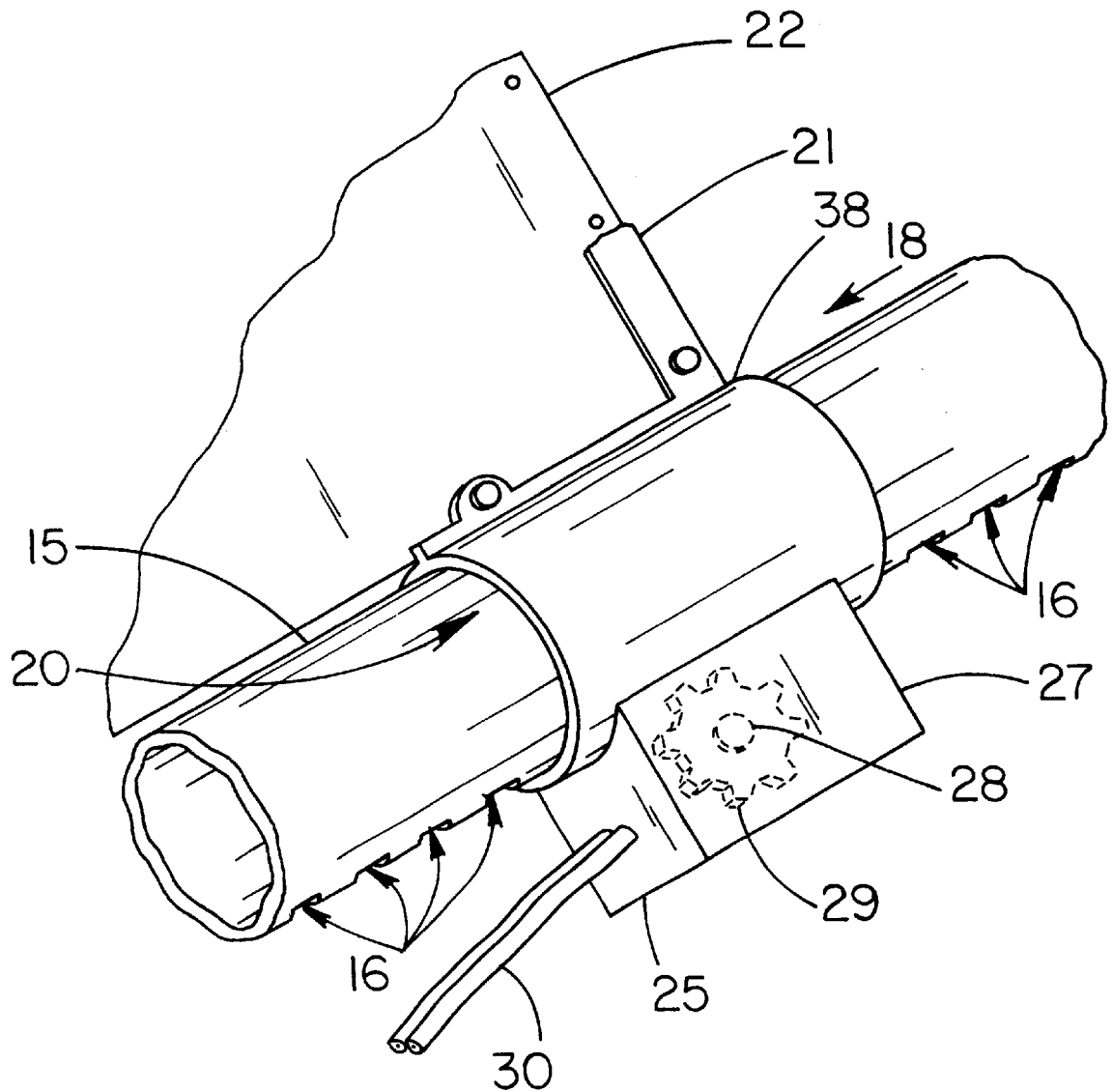
FIG. 3 is a detailed perspective view of the lower track member and the lower shade support member of the present invention.

With reference now to the drawings, and in particular to FIGS. 1 through 3 thereof, a new vehicle security shade assembly embodying the principles and concepts of the present invention and generally designated by the reference numeral 10 will be described.

As best illustrated in FIGS. 1 through 3, the vehicle security shade assembly 10 generally comprises two elongate support members 11, 12 each being adapted to be securely and conventionally mounted to an inner side of a windshield 32 along a respective side end thereof. The elongate support members 11,12 are essentially spring-loaded spindles which are adapted to extend from a top of the windshield 32 to a bottom thereof. Upper and lower track members 13,15 are securely and conventionally attached to the elongate support members 11,12 and extend therebetween with the upper and lower track members 13,15 being essentially tubular members. The tubular member of the upper track member 13 has a bore 19 extending therethrough and also has a longitudinal slot 14 extending through a wall on a bottom side thereof with the tubular member of the lower track member 15 having a plurality of notches 16 being spaced apart and extending in an exterior of a wall of the lower track member 15 and extending along a length thereof.

The vehicle security shade assembly 10 also includes upper and lower shade support members 17,18 each being movably and conventionally mounted to and movable along a respective track member 13,15. Each of the lower shade support members 18 includes a sleeve-like member 38 having a bore 20 extending therethrough and being slidably mounted about the lower track member 15.

The vehicle security shade assembly 10 further includes two shade members 22,23 each being retractably carried about a respective elongate support member 11,12 and also being securely and conventionally attached to a respective upper shade support member 17 and to a respective lower shade support member 18 for movement therewith. Each of the shade members 22,23 is essentially made of opaque sheet-like durable and non-tearing material which is retractably carried about a respective spring-loaded spindle. Each of the sleeve-like members 38 includes a bracket member 21 integrally attached to the exterior wall thereof and being securely and conventionally attached to a respective shade member 22,23. Each of the upper shade support members 17 is a tubular member being integrally attached along a top end 24 of a respective shade member 22,23 and being slidably disposed inside the bore 19 of the upper track member 13. Each of the shade members 22,23 has a portion extending through said longitudinal slot 14 of said upper track member 13.

Means for moving the shade members 22,23 along the track members 13,15 include two housings 25,26 each being securely and conventionally attached to the wall of a respective sleeve-like member 18, and also includes motors 27 each being securely and conventionally disposed in a respective housing 25,26, and further include sprockets 29 each being rotatably and conventionally mounted to a shaft 28 of a respective motor 27 and each being engaged with the notches 16 of the lower track member 15, and also includes power cords 30 each being conventionally connected to a respective motor 27 and being adapted to be connected to a power supply for energizing the motor 27.

In use, the user uses a switch to energize the motors 27 which moves the shade support members 17,18 and the shade members 22,23 long the windshield 32 of the vehicle 31 to block the view of a person trying to steal the vehicle 31 and also to provide shade for the interior of the vehicle 31. When not in use, the shade members 22,23 are retractably carried about the spring-loaded spindles.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle security shade assembly comprising:

elongate support members each being adapted to be securely mounted to an inner side of a windshield along a respective side end thereof;

upper and lower track members being securely attached to said elongate support members and extending therebetween;

shade support members each being movably mounted to and movable along a respective track member;

shade members each being retractable carried about a respective said elongate support member and also being securely attached to a respective shade support member for movement therewith;

means for moving said shade members along said track members;

wherein said upper and lower track members are essentially tubular members;

wherein said tubular member of said upper track member has a bore extending therethrough and also has a longitudinal slot extending through a wall on a bottom side thereof; and wherein said tubular member of said lower track member has a plurality of notches being spaced apart and extending in an exterior of a wall of said lower track member and extending along a length thereof.

2. A vehicle security shade assembly as described in claim 1, wherein said shade support members include upper shade support members and lower shade support members.

3. A vehicle security shade assembly as described in claim 2, wherein each of said upper shade support members is a tubular member being integrally attached along a top end of a respective said shade member and being slidably disposed inside said bore of said upper track member.

4. A vehicle security shade assembly as described in claim 2, wherein each of said lower shade support members is a sleeve-like member having a bore extending therethrough and being slidably mounted about said lower track member.

5. A vehicle security shade assembly as described in claim 4, wherein each of said sleeve-like members includes a bracket member integrally attached to said exterior wall thereof and being securely attached to a respective said shade member.

6. A vehicle security shade assembly as described in claim 1, wherein each of said shade members is essentially made of opaque sheet-like durable and non-tearing material which is retractably carried about a respective said spring-loaded spindle, each of said shade members having a portion extending through said longitudinal slot of said upper track member.

7. A vehicle security shade assembly as described in claim 1, wherein said means for moving said shade members along said track members include housings each being securely attached to said wall of a respective said sleeve-like member, and also include motors each being securely disposed in a respective said housing, and further includes sprockets each being rotatably mounted to a shaft of a respective said motor and each being engaged with said notches of said lower track member, and also include power cords each being connected to a respective said motor and being adapted for connecting to a power supply for energizing said motor.

8. A vehicle security shade assembly comprising:

elongate support members each being adapted to be securely mounted to an inner side of a windshield along a respective side end thereof, said elongate support members being essentially spring-loaded spindles which are adapted to extend from a top of the windshield to a bottom thereof;

upper and lower track members being securely attached to said elongate support members and extending therebetween, said upper and lower track members being essentially tubular members, said tubular member of said upper track member having a bore extending therethrough and also having a longitudinal slot extending through a wall on a bottom side thereof, said tubular member of said lower track member having a plurality of notches being spaced apart and extending in an exterior of a wall of said lower track member and extending along a length thereof;

upper and lower shade support members each being movably mounted to and movable along a respective track member, each of said lower shade support members being a sleeve-like member having a bore extending therethrough and being slidably mounted about said lower track member;

shade members each being retractably carried about a respective said elongate support member and also being securely attached to a respective said upper shade support member and to a respective said lower shade support member for movement therewith, each of said shade members being essentially made of opaque sheet-like durable and non-tearing material which is retractably carried about a respective said spring-loaded spindle, each of said sleeve-like members including a bracket member integrally attached to said exterior wall thereof and being securely attached to a respective said shade member, each of said upper shade support members being a tubular member being integrally attached along a top end of a respective said shade member and being slidably disposed inside said bore of said upper track member, each of said shade members having a portion extending through said longitudinal slot of said upper track member; and means for moving said shade members along said track members including housings each being securely attached to said wall of a respective said sleeve-like member, and also including motors each being securely disposed in a respective said housing, and further including sprockets each being rotatably mounted to a shaft of a respective said motor and each being engaged with said notches of said lower track member, and also including power cords each being connected to a respective said motor and being adapted for connecting to a power supply for energizing said motor.

9. A vehicle security shade assembly comprising:

elongate support members each being adapted to be securely mounted to an inner side of a windshield along a respective side end thereof;

upper and lower track members being securely attached to said elongate support members and extending therebetween;

shade support members each being movably mounted to and movable along a respective track member;

shade members each being retractably carried about a respective said elongate support member and also being securely attached to a respective shade support member for movement therewith;

means for moving said shade members along said track members;

wherein said upper and lower track members are essentially tubular members; and wherein said tubular member of said lower track member has a plurality of notches being spaced apart and extending in an exterior of a wall of said lower track member and extending along a length thereof.

10. A vehicle security shade assembly as described in claim 9, wherein said upper and lower track members are essentially tubular members.

11. A vehicle security shade assembly as described in claim 9, wherein said tubular member of said upper track member has a bore extending therethrough and also has a longitudinal slot extending through a wall on a bottom side thereof.

12. A vehicle security shade assembly as described in claim 9, wherein said shade support members include upper shade support members and lower shade support members.

13. A vehicle security shade assembly as described in claim 12, wherein each of said upper shade support members is a tubular member being integrally attached along a top end of a respective said shade member and being slidably disposed inside said bore of said upper track member.

14. A vehicle security shade assembly as described in claim 12, wherein each of said lower shade support members is a sleeve-like member having a bore extending therethrough and being slidably mounted about said lower track member.

15. A vehicle security shade assembly as described in claim 14, wherein each of said sleeve-like members includes a bracket member integrally attached to said exterior wall thereof and being securely attached to a respective said shade member.

16. A vehicle security shade assembly as described in claim 9 wherein each of said shade members is essentially made of opaque sheet-like durable and non-tearing material, each of said shade members having a portion extending through said longitudinal slot of said upper track member.

17. A vehicle security shade assembly as described in claim 19, wherein said means for moving said shade members along said track members include housings each being securely attached to said wall of a respective said sleeve-like member, and also include motors each being securely disposed in a respective said housing, and further includes sprockets each being rotatably mounted to a shaft of a respective said motor and each being engaged with said notches of said lower track member, and also include power cords each being connected to a respective said motor and being adapted for connecting to a power supply for energizing said motor.

\* \* \* \* \*